(12) United States Patent
Chen

(10) Patent No.: US 11,879,495 B2
(45) Date of Patent: Jan. 23, 2024

(54) THERMALLY INSULATING FIXTURE

(71) Applicant: Wei-Chih Chen, Taichung (TW)

(72) Inventor: Wei-Chih Chen, Taichung (TW)

(*) Notice: Subject to any disclaimer, the term of this patent is extended or adjusted under 35 U.S.C. 154(b) by 594 days.

(21) Appl. No.: 17/164,974

(22) Filed: Feb. 2, 2021

(65) Prior Publication Data

US 2022/0243759 A1    Aug. 4, 2022

(51) Int. Cl.
| | | |
|---|---|---|
| *E04B 1/41* | (2006.01) | |
| *F16B 43/00* | (2006.01) | |
| *F16B 5/02* | (2006.01) | |
| *F16B 37/14* | (2006.01) | |
| *F16B 33/00* | (2006.01) | |

(52) U.S. Cl.
CPC .......... *F16B 43/001* (2013.01); *E04B 1/4178* (2013.01); *F16B 5/02* (2013.01); *F16B 5/0241* (2013.01); *F16B 33/004* (2013.01); *F16B 37/14* (2013.01)

(58) Field of Classification Search
CPC .... E04B 1/4178; E04B 1/7616; F16B 33/004; F16B 37/14; F16B 43/001
See application file for complete search history.

(56) References Cited

U.S. PATENT DOCUMENTS

| | | | | |
|---|---|---|---|---|
| 7,562,506 B2* | 7/2009 | Hohmann, Jr. | ....... | E04B 1/4178 52/565 |
| 7,780,384 B2* | 8/2010 | Katou | ....... | B60R 7/10 410/112 |
| 8,201,374 B2* | 6/2012 | Hohmann, Jr. | ....... | E04B 1/4178 52/379 |
| 8,347,581 B2* | 1/2013 | Doerr | ....... | E04B 1/4178 52/700 |
| 8,826,624 B2* | 9/2014 | Dalen | ....... | E04B 1/38 411/389 |
| 10,221,559 B2* | 3/2019 | Hatzinikolas | ......... | E04G 21/185 |
| 11,319,980 B2* | 5/2022 | Lai | ....... | F16B 25/0026 |
| 2005/0100425 A1* | 5/2005 | Wu | ....... | F16B 37/14 411/372.5 |
| 2019/0165514 A1* | 5/2019 | Kondo | ....... | F16B 35/048 |

* cited by examiner

*Primary Examiner* — Michael P Ferguson
(74) *Attorney, Agent, or Firm* — Best & Flanagan LLP

(57) ABSTRACT

A thermally insulating fixture includes a self-tapping screw, a fixed member mounted on the self-tapping screw, and a thermally insulating member wrapping the fixed member. The fixed member is provided with a first through hole. The thermally insulating member is provided with a second through hole and a positioning groove. The self-tapping screw extends through the second through hole of the thermally insulating member and the first through hole of the fixed member. A thermally insulating cover is mounted in the positioning groove and covers the self-tapping screw. The thermally insulating cover has a receiving space which receives the self-tapping screw. The thermally insulating cover has a positioning flange which is positioned in the positioning groove when the thermally insulating cover covers the head of the self-tapping screw.

10 Claims, 21 Drawing Sheets

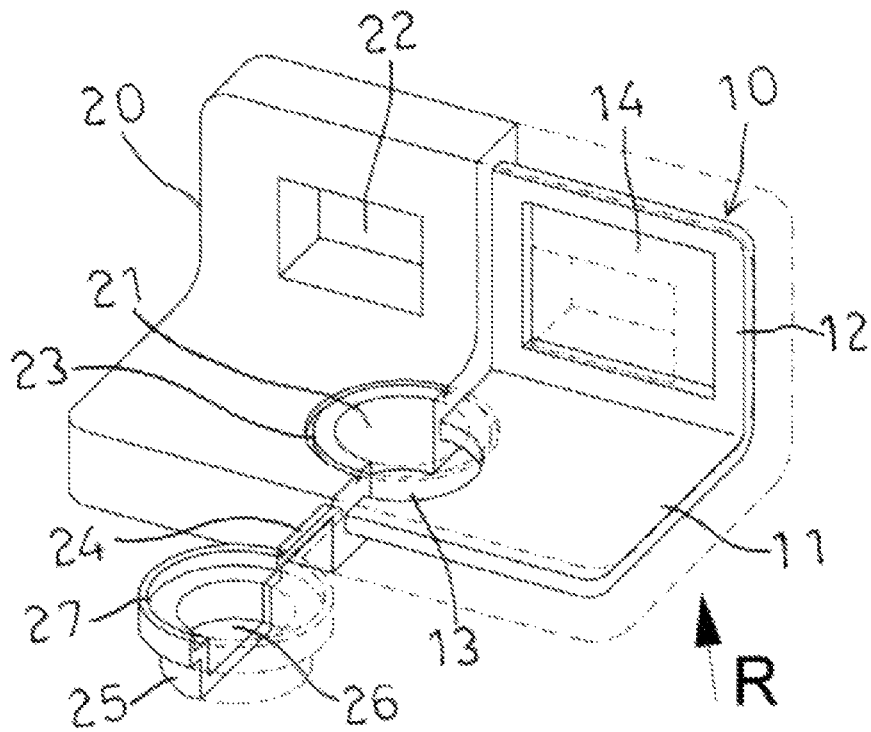
FIG·9
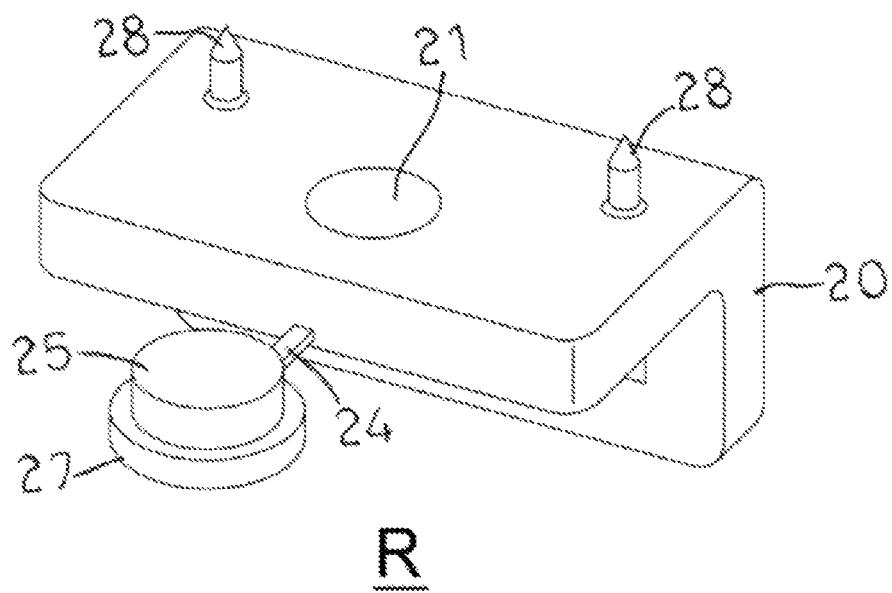
FIG·10

A-A

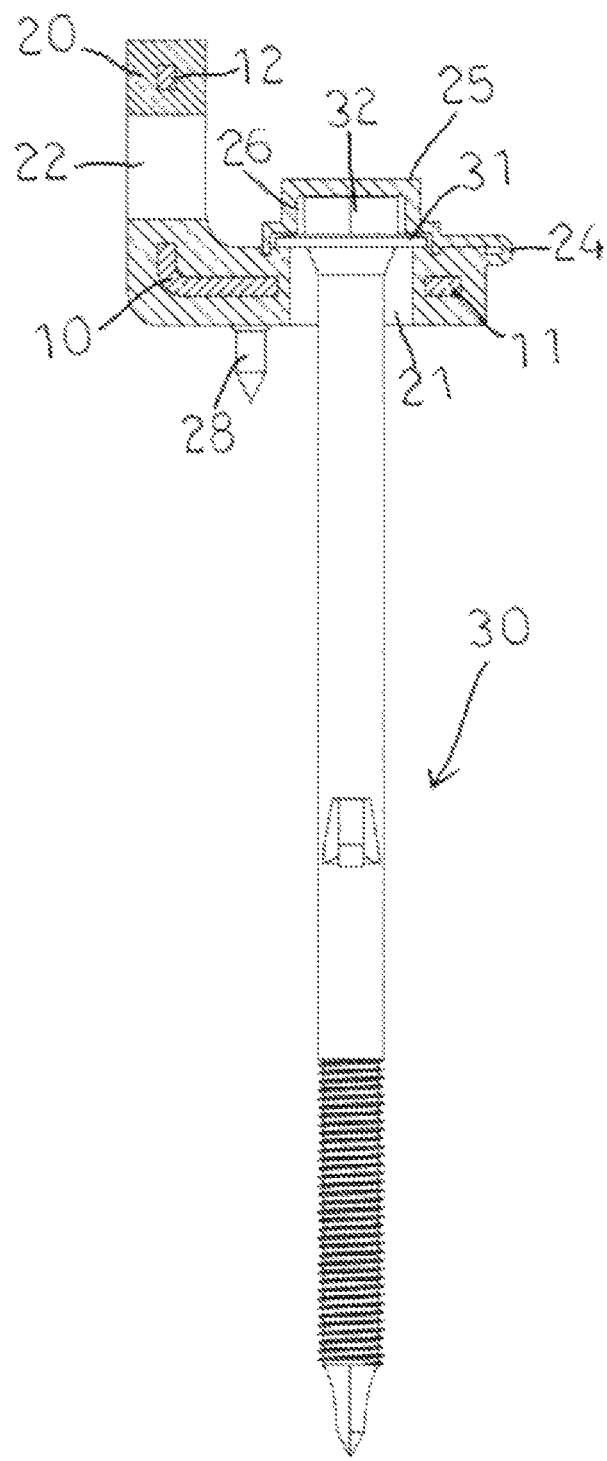
FIG·13

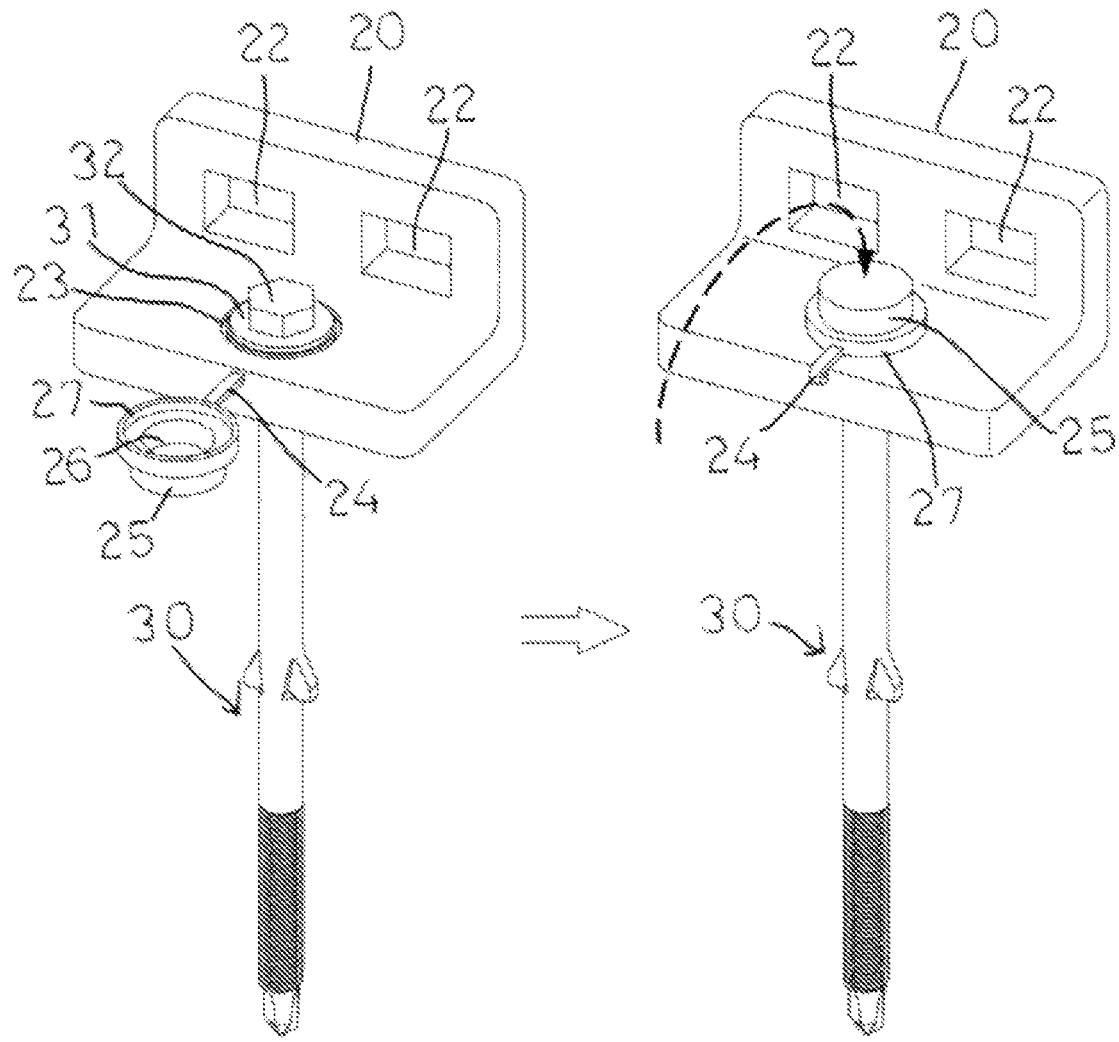
FIG·14

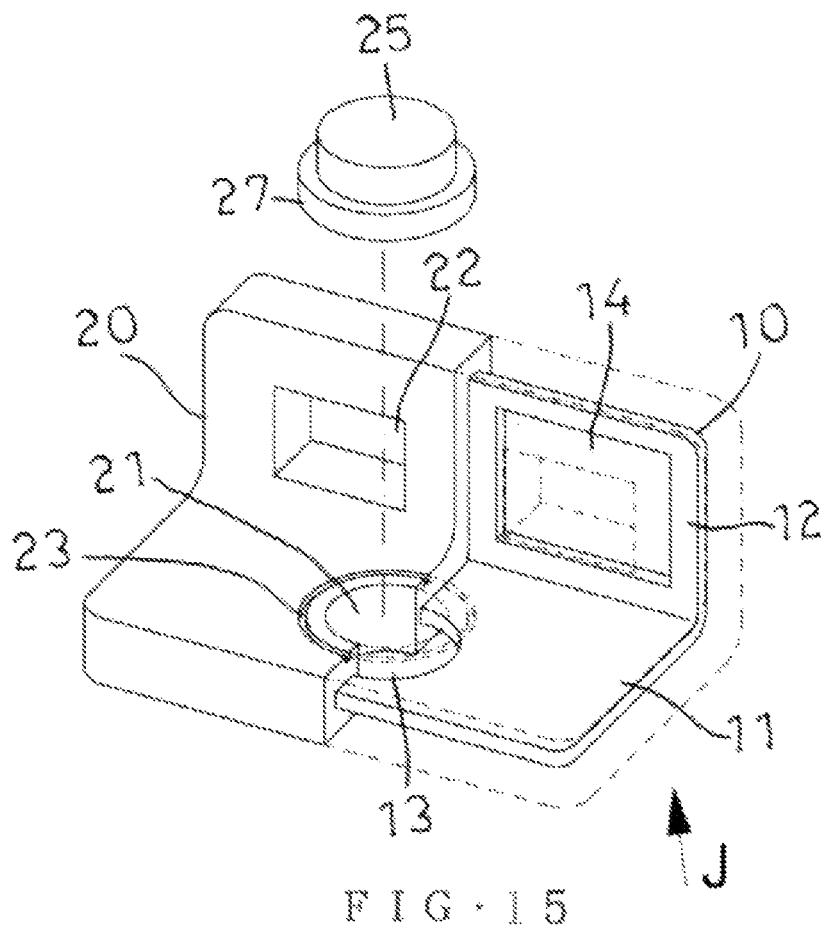
FIG·15
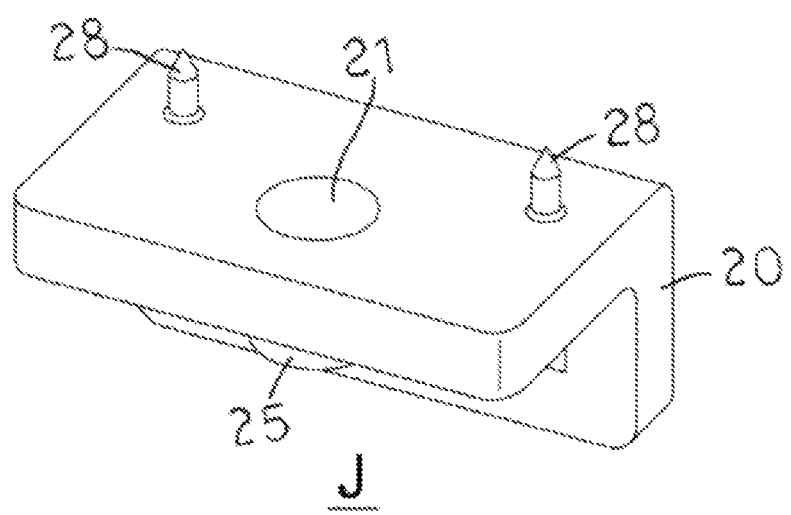
FIG·16

THERMALLY INSULATING FIXTURE

BACKGROUND OF THE INVENTION

1. Field of the Invention

The present invention relates to a fixture and, more particularly, to a thermally insulating fixture.

2. Description of the Related Art

A conventional fixture in accordance with the prior art shown in FIGS. 1 and 2 comprises an L-shaped fixed member 40 and a screw 50. The fixed member 40 includes a first plate 41 arranged horizontally and a second plate 42 arranged vertically. The first plate 41 is provided with a through hole 43. The second plate 42 is provided with a slot 44. The screw 50 extends through the through hole 43 and has a first end provided with a washer 53 and a head 54 and a second end provided with a drilling tip 51 and an external thread 52. The head 54 is driven by a driving tool so as to rotate the screw 50. However, the fixed member 40 and the screw 50 are exposed outward and cannot provide a thermally insulating function efficiently, so that the cold air in the winter or the hot air in the summer easily permeates through the fixed member 40 and the screw 50 into the house.

Another conventional fixture in accordance with the prior art shown in FIGS. 3 and 4 comprises a wing nut anchor 90, a heat isolating washer N, and a screw 80. The wing nut anchor 90 is provided with a plurality of semicircular ears 91 each having an internal thread 92. The wing nut anchor 90 has two wing plates 93 each provided with a hollow 94. The wing nut anchor 90 is provided with a recessed portion 95. The heat isolating washer N has a bottom provided with a soft washer N1. An axial hole N2 is formed in the heat isolating washer N and the soft washer N1. The screw 80 is provided with an external thread 82 screwed through the internal thread 92 and extends through the axial hole N2. The screw 80 has a first end provided with a washer 83 and a head 84 and a second end provided with a drilling tip 81. The washer 83 is mounted in the recessed portion 95. The head 84 is driven by a driving tool so as to rotate the screw 80. A positioning rack 5 is mounted on the wing nut anchor 90, with two bent legs 6 of the positioning rack 5 being inserted into the hollows 94 of the two wing plates 93. Thus, the positioning rack 5 is hooked on the wing nut anchor 90. However, the screw 80 and the wing nut anchor 90 are exposed outward and cannot provide a thermally insulating function efficiently, so that the cold air in the winter or the hot air in the summer easily permeates through the screw 80 and the wing nut anchor 90 into the house. In addition, the ears 91 of the wing nut anchor 90 has a weak structure and easily causes a stress concentration, so that when the two bent legs 6 of the positioning rack 5 are pulled forward, the two wing plates 93 of the wing nut anchor 90 are easily bent and distortion.

A conventional wing nut anchor in accordance with the prior art shown in FIG. 5 is made of an iron sheet plate 100 which is stamped to form a rectangular hole 101 and a plurality of oblong holes 102. Then, the iron sheet plate 100 is stamped to form two semicircular ears 103. Then, the iron sheet plate 100 is stamped and bent to form an integrity. Then, a heat isolating layer 104 is wrapped on the iron sheet plate 100. Then, each of the two semicircular ears 103 is formed with an internal thread 105.

A conventional thermal clip in accordance with the prior art shown in FIGS. 6 and 7 comprises a heat isolating wing plate 70, a heat isolating washer N, and a screw 60. The heat isolating wing plate 70 has two fixing portions 72 and an axial hole 71. Each of the two fixing portions 72 has a fixing hole 73. The heat isolating washer N has a bottom provided with a soft washer N1. An axial hole N2 is formed in the heat isolating washer N and the soft washer N1. The screw 60 extends through the axial hole 71 of the heat isolating wing plate 70 and the axial hole N2 of the heat isolating washer N. The screw 60 has a first end provided with a washer 61 and a head 62 and a second end provided with an external thread 63 and a drilling tip 64. The head 62 is driven by a driving tool so as to rotate the screw 60. However, the washer 61 and the head 62 of the screw 60 are exposed outward and cannot provide a thermally insulating function efficiently, so that the cold air in the winter or the hot air in the summer easily permeates through the washer 61 and the head 62 of the screw 60 into the house.

BRIEF SUMMARY OF THE INVENTION

The primary objective of the present invention is to provide a thermally insulating fixture that provides a thermally insulating effect to isolate a heat transfer.

In accordance with the present invention, there is provided a thermally insulating fixture comprising a self-tapping screw, a fixed member mounted on the self-tapping screw, and a thermally insulating member wrapping the fixed member. The fixed member has an L-shaped profile. The fixed member is made of an iron sheet plate that is stamped and bent to form the fixed member. The fixed member includes a first plate and a second plate. The first plate of the fixed member is provided with a first through hole. The second plate of the fixed member is provided with two first perforations. The thermally insulating member is made of refractory material. The thermally insulating member is integrally coated on an outside of the fixed member. The thermally insulating member is provided with a second through hole corresponding to the first through hole of the first plate. The thermally insulating member is provided with two second perforations corresponding to the two first perforations of the second plate respectively. The thermally insulating member is provided with a positioning groove. The positioning groove of the thermally insulating member surrounds the second through hole. A thermally insulating cover is mounted in the positioning groove of the thermally insulating member and covers the self-tapping screw. The thermally insulating cover has an interior provided with a receiving space which receives the self-tapping screw. The thermally insulating cover has a periphery provided with a positioning flange which is positioned in the positioning groove of the thermally insulating member when the thermally insulating cover covers the self-tapping screw. The positioning flange has an annular shape. The self-tapping screw extends through the second through hole of the thermally insulating member and the first through hole of the fixed member. The self-tapping screw has an upper end provided with a washer and a screw head.

According to the primary advantage of the present invention, the thermally insulating member presses the foam layer closely and tightly by the resilient ductility of the thermally insulating member, to provide a thermally insulating effect and to break or block a heat conduction or convection, thereby preventing the cold air in the winter or the hot air in the summer from entering the house.

According to another advantage of the present invention, the thermally insulating cover covers the washer and the screw head of the self-tapping screw, to enhance the thermally insulating effect.

According to a further advantage of the present invention, the positioning flange of the thermally insulating cover is positioned in the positioning groove of the thermally insulating member when the thermally insulating cover covers the self-tapping screw, to provide a better thermal isolating and heat preservation effect.

According to a further advantage of the present invention, the fixed member is worked easily and simply to save the cost of fabrication.

According to a further advantage of the present invention, the thermally insulating member coats the fixed member, and the thermally insulating cover covers the self-tapping screw, thereby preventing the warm air in the house from being transferred outward through the fixed member and the self-tapping screw.

According to a further advantage of the present invention, the two positing pins of the thermally insulating member are inserted into and locked in the foam layer so that the thermally insulating member is secured to the foam layer steadily.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

FIG. 9 is a partial perspective schematic view of the thermally insulating fixture in accordance with the first preferred embodiment of the present invention.

FIG. 10 is a perspective view of the thermally insulating fixture taken along arrow R as shown in FIG. 9.

FIG. 13 is a cross-sectional assembly view of the thermally insulating fixture in accordance with the first preferred embodiment of the present invention.

FIG. 14 is a perspective operational view showing operations of a thermally insulating cover of the thermally insulating fixture in accordance with the first preferred embodiment of the present invention.

FIG. 15 is a partial exploded perspective view of a thermally insulating fixture in accordance with the second preferred embodiment of the present invention.

FIG. 16 is a perspective view of the thermally insulating fixture taken along arrow J as shown in FIG. 15.

DETAILED DESCRIPTION OF THE INVENTION

Figure 1:
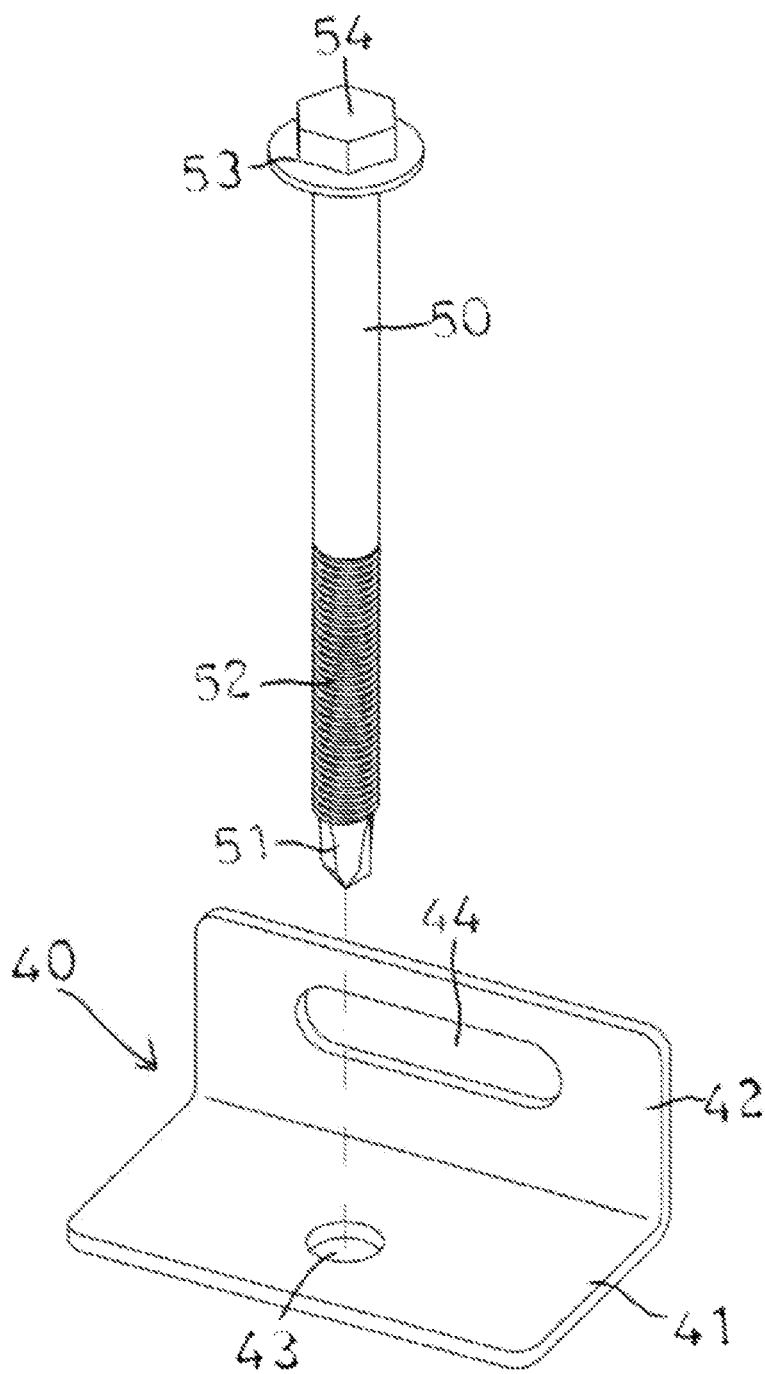
FIG. 1 is an exploded perspective view of a conventional fixture in accordance with the prior art.
Figure 2:
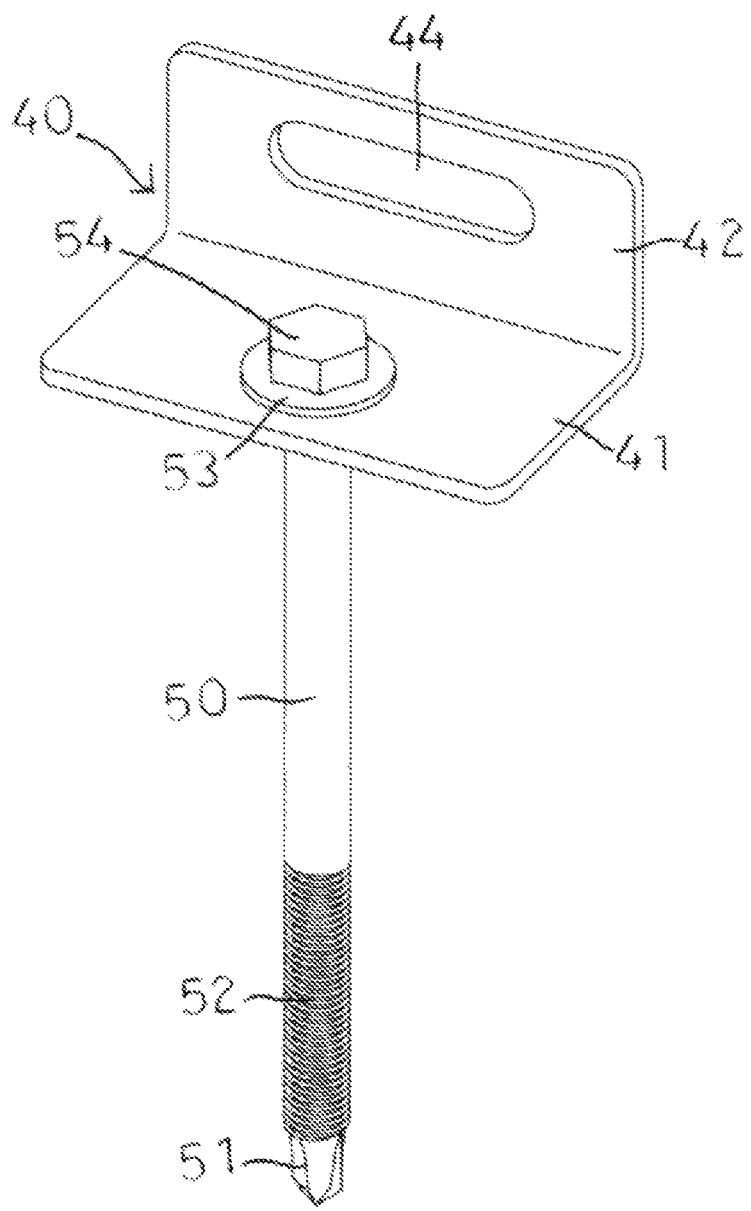
FIG. 2 is a perspective assembly view of the conventional fixture as shown in FIG. 1.
Figure 3:
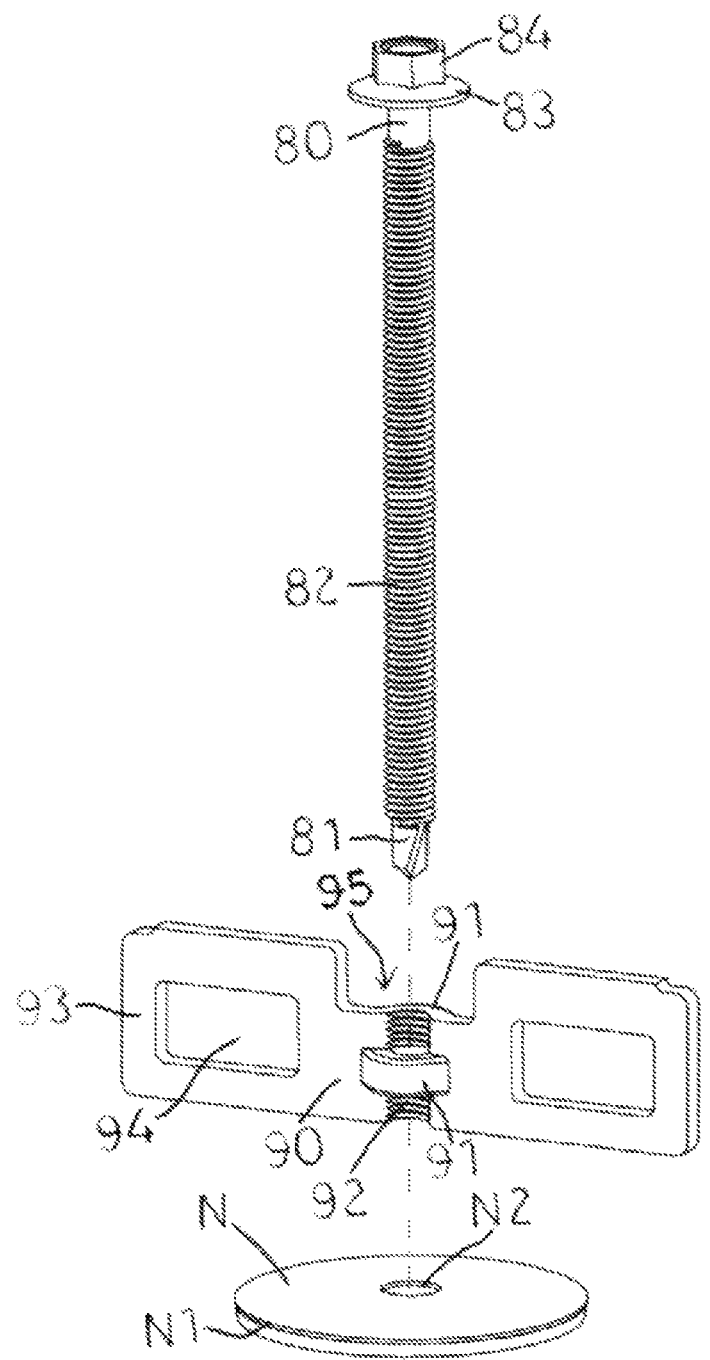
FIG. 3 is a partial exploded perspective view of another conventional fixture in accordance with the prior art.
Figure 4:
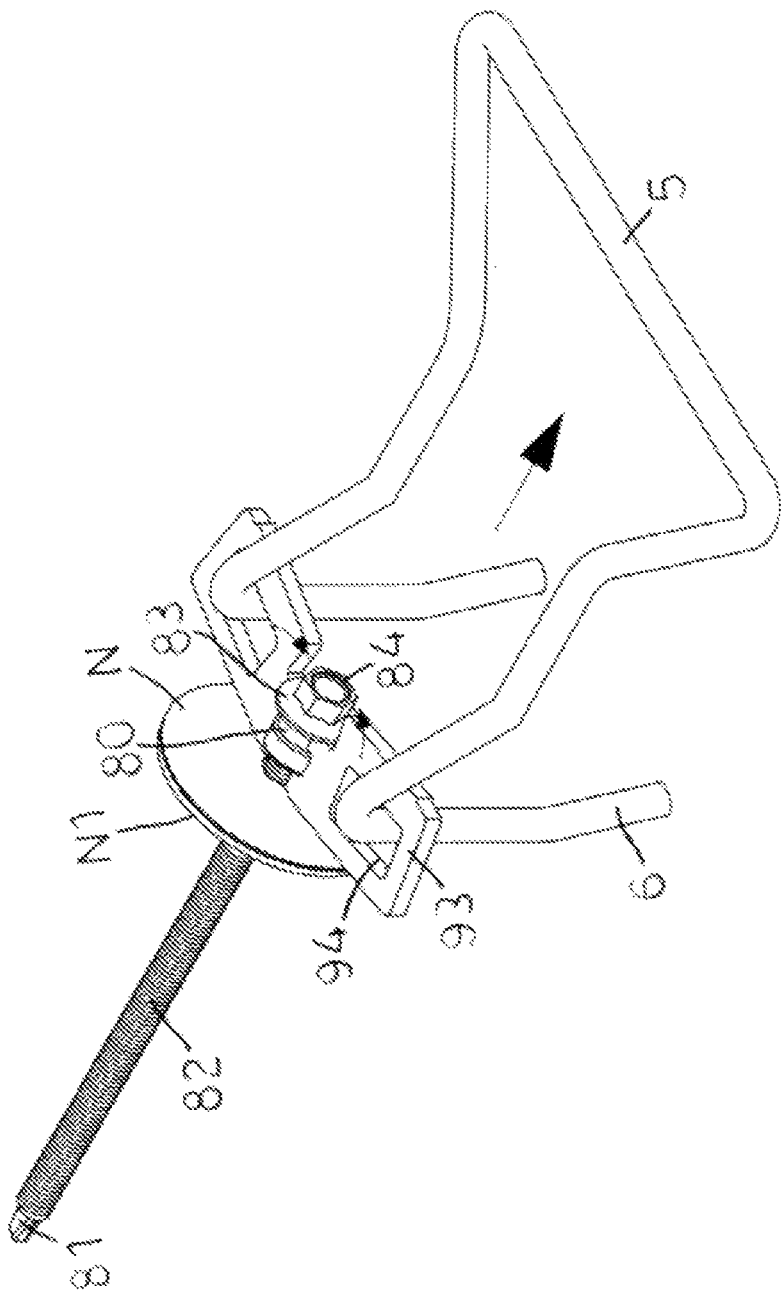
FIG. 4 is a perspective assembly view of the conventional fixture as shown in FIG. 3.
Figure 5:
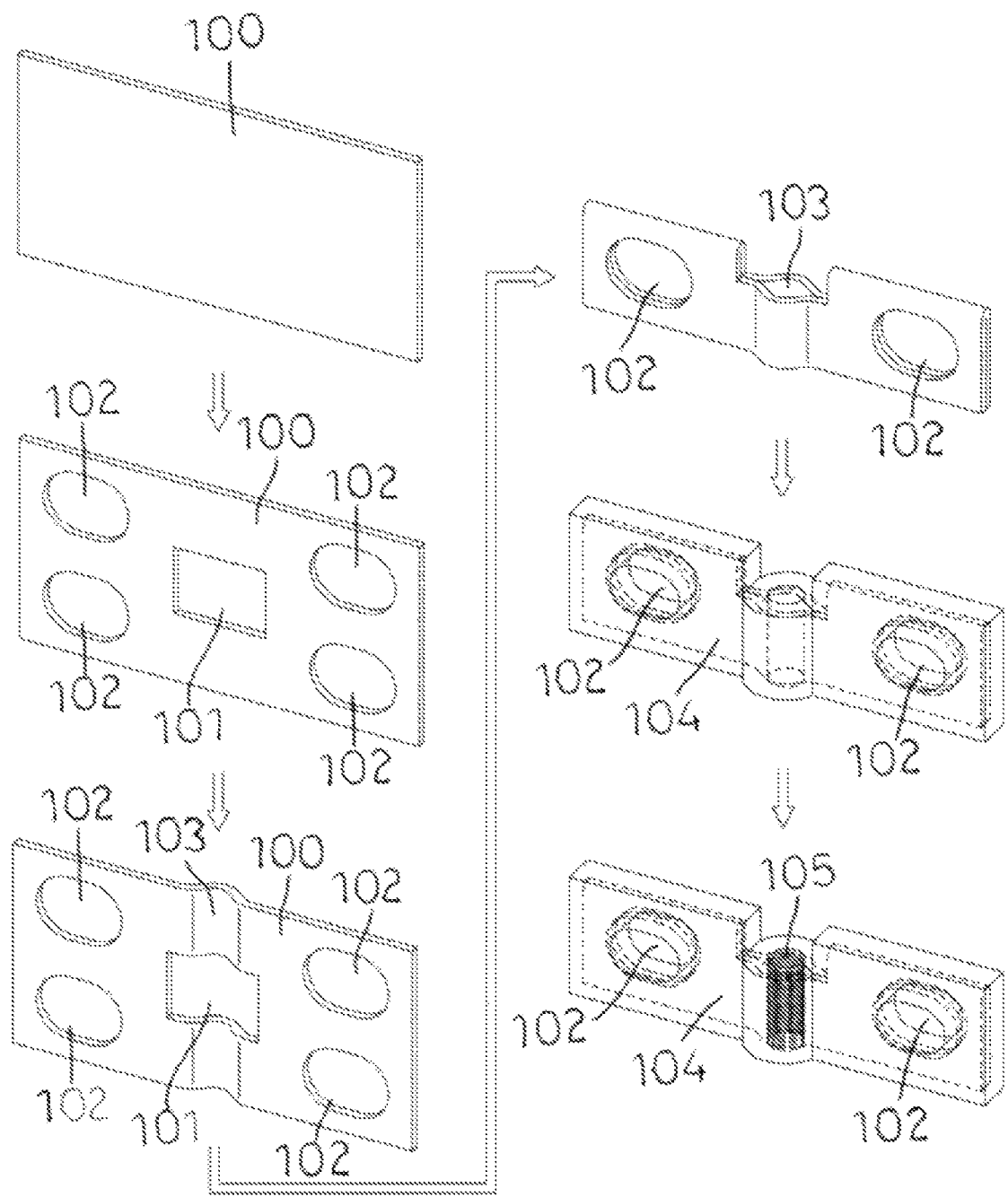
FIG. 5 is a perspective view showing manufacturing procedures of a conventional wing nut anchor in accordance with the prior art.
Figure 6:
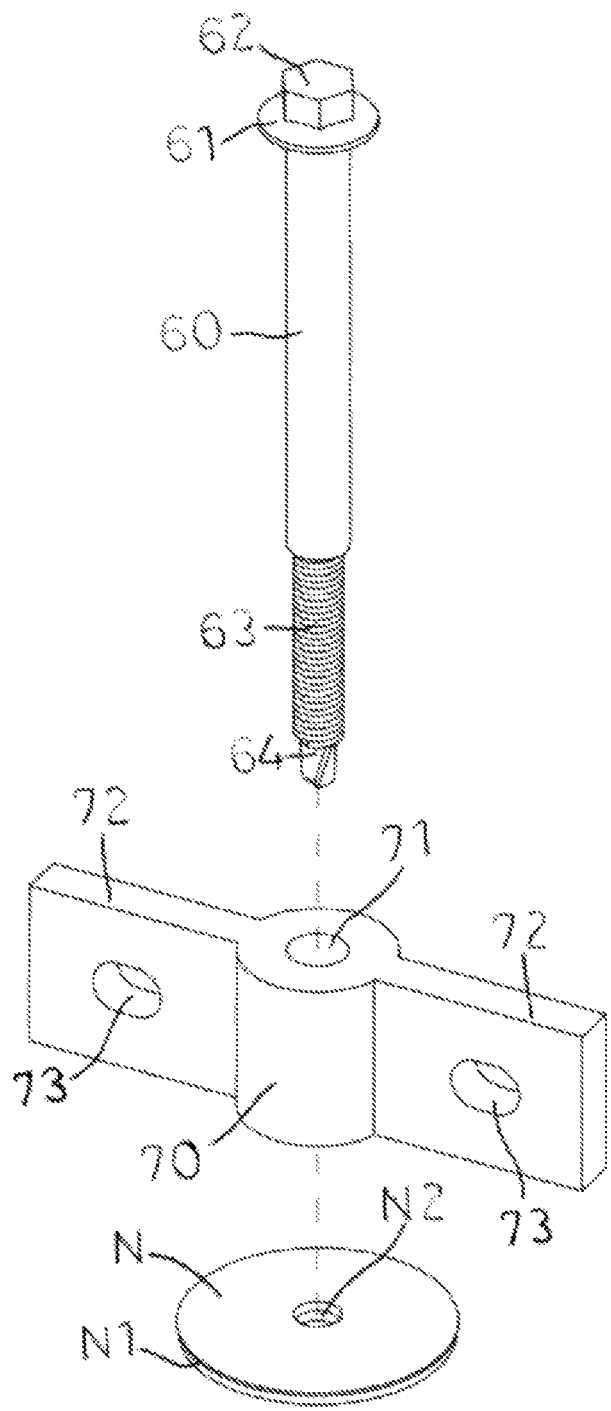
FIG. 6 is an exploded perspective view of a conventional thermal clip in accordance with the prior art.
Figure 7:
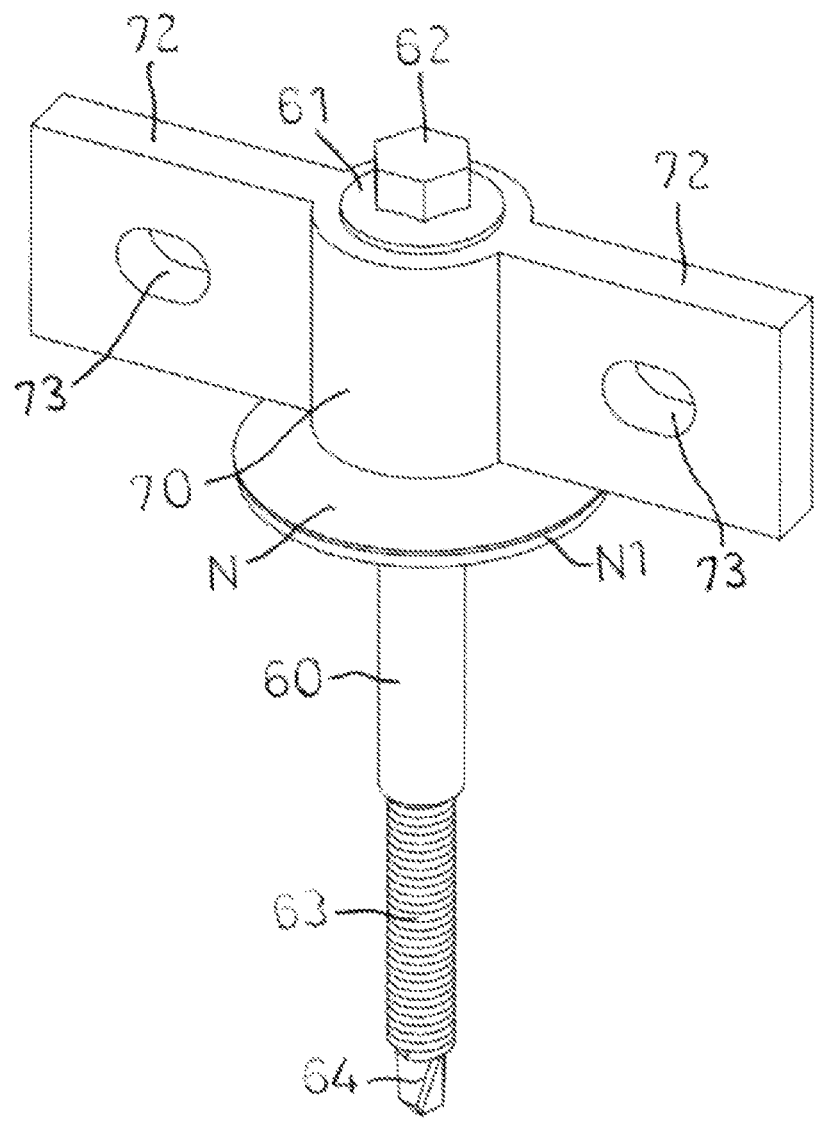
FIG. 7 is a perspective assembly view of the conventional fixture as shown in FIG. 6.

Referring to the drawings and initially to FIGS. 8-14, a thermally insulating fixture in accordance with the preferred embodiment of the present invention comprises a self-tapping screw 30, a fixed member (or fastener) 10 mounted on the self-tapping screw 30, and a thermally insulating member 20 wrapping (or covers or enclosed around) the fixed member 10.

Figure 8:
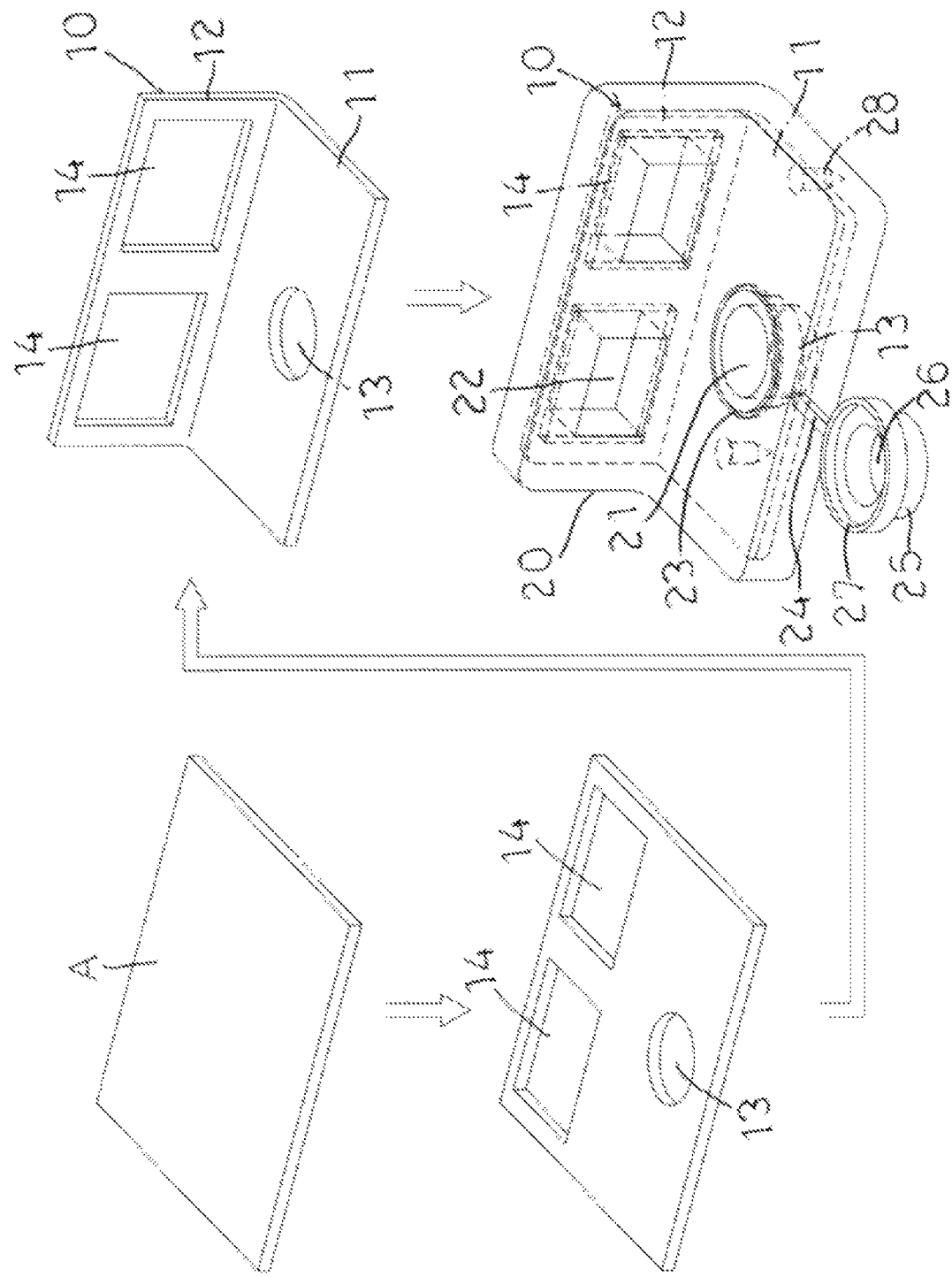
FIG. 8 is a perspective view showing manufacturing procedures of a thermally insulating fixture in accordance with the first preferred embodiment of the present invention.
Figure 11:
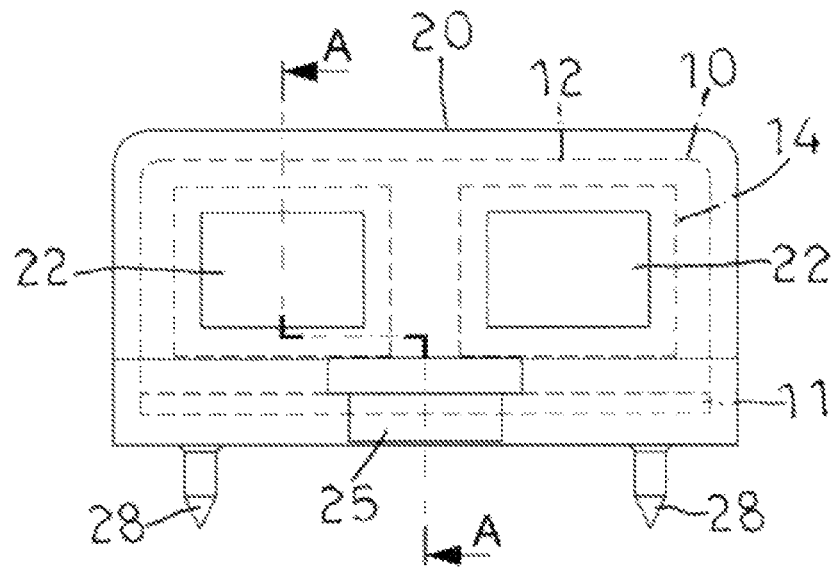
FIG. 11 is a planar view of the thermally insulating fixture in accordance with the first preferred embodiment of the present invention.
Figure 12:
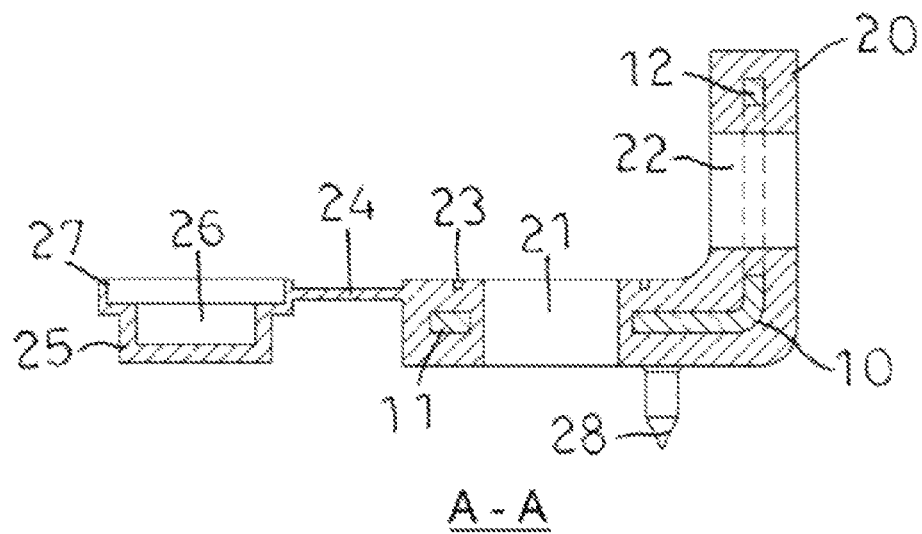
FIG. 12 is a cross-sectional view of the thermally insulating fixture taken along line A-A as shown in FIG. 11.
Figure 17:
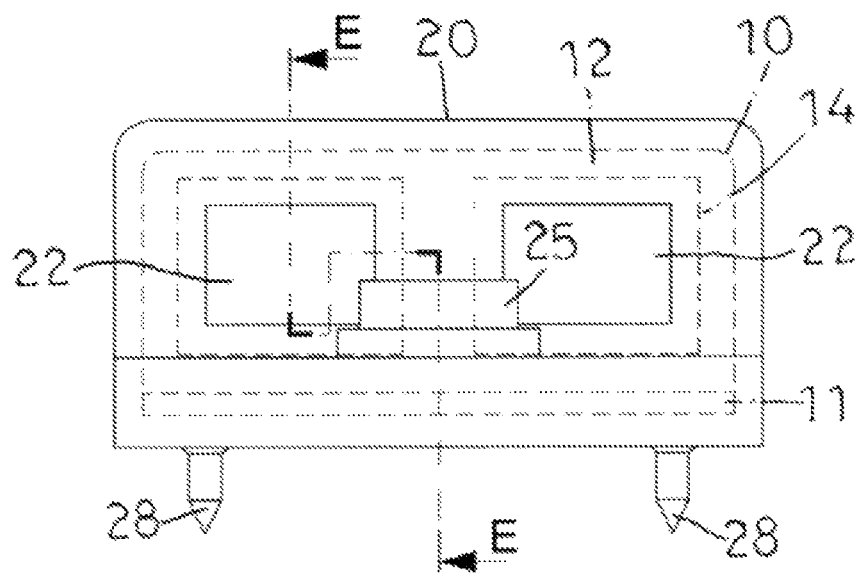
FIG. 17 is a planar view of the thermally insulating fixture in accordance with the second preferred embodiment of the present invention.
Figure 18:
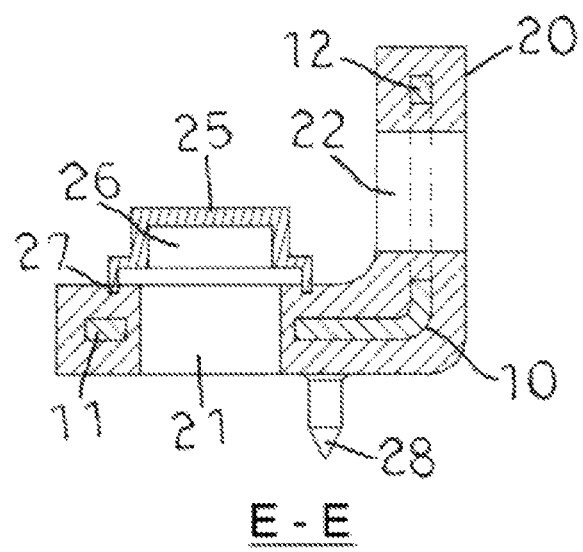
FIG. 18 is a cross-sectional view of the thermally insulating fixture taken along line E-E as shown in FIG. 17.
Figure 19:
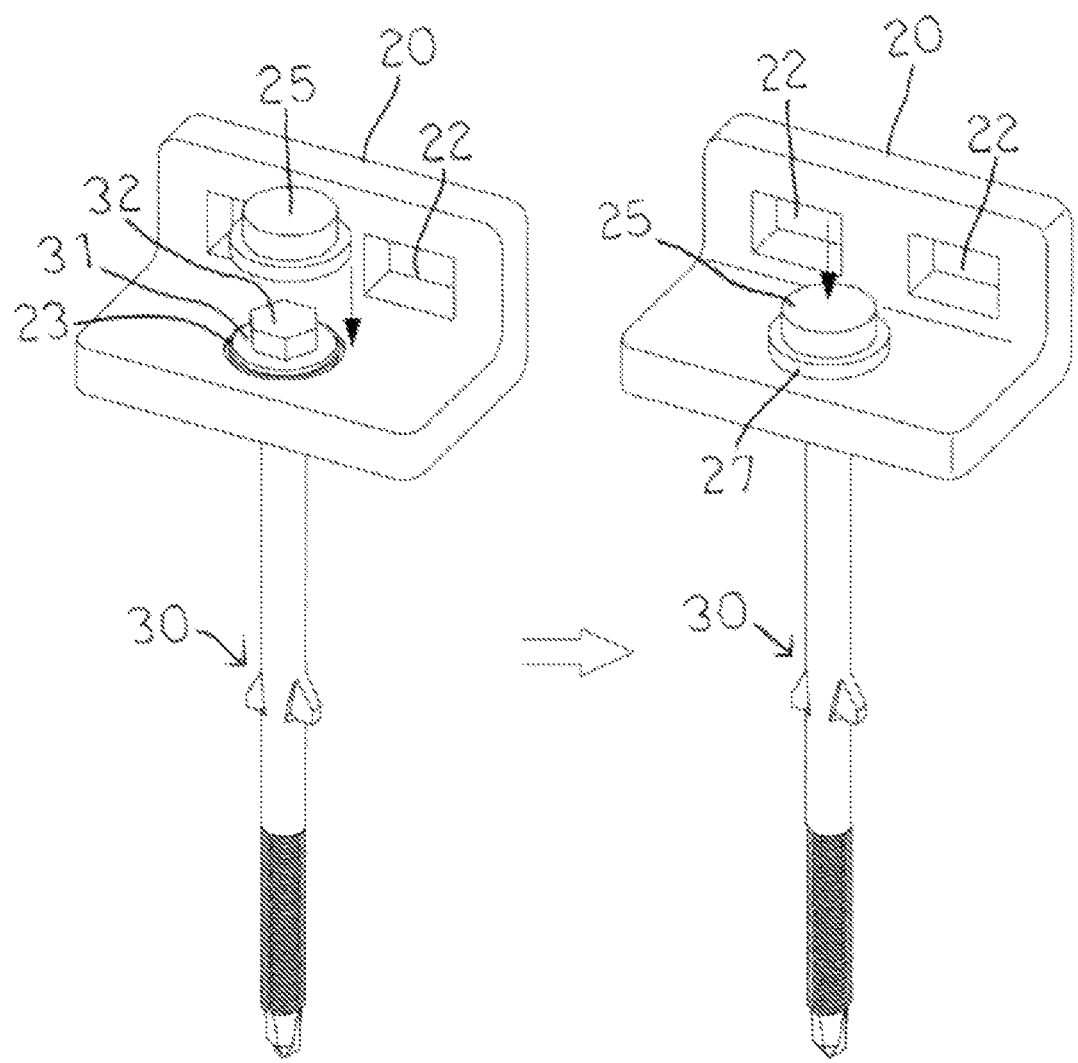
FIG. 19 is a perspective operational view showing operations of a thermally insulating cover of the thermally insulating fixture in accordance with the second preferred embodiment of the present invention.

The fixed member 10 has an L-shaped profile. The fixed member 10 is made of an iron sheet plate A that is stamped (or pressed) and bent to form the fixed member 10 as shown in FIG. 8. The fixed member 10 includes a first plate 11 arranged horizontally and a second plate 12 arranged vertically. The first plate 11 of the fixed member 10 is provided with a first through hole 13 located at a middle position thereof. The second plate 12 of the fixed member 10 is provided with two first perforations 14.

The thermally insulating member 20 is made of refractory material. The thermally insulating member 20 is integrally formed by injection molding and is coated on an outside of the fixed member 10. The thermally insulating member 20 is provided with a second through hole 21 corresponding to the first through hole 13 of the first plate 11. The thermally insulating member 20 is provided with two second perforations 22 corresponding to the two first perforations 14 of the second plate 12 respectively. The thermally insulating member 20 is provided with a positioning groove 23. The positioning groove 23 is located above the second through hole 21. The positioning groove 23 of the thermally insulating member 20 has an annular shape and surrounds the second through hole 21. A thermally insulating cover 25 is detachably mounted in the positioning groove 23 of the thermally insulating member 20 and covers the self-tapping screw 30. The thermally insulating cover 25 has an interior provided with a receiving space 26 which receives the self-tapping screw 30. The thermally insulating cover 25 has a periphery provided with a positioning flange 27 which is positioned in the positioning groove 23 of the thermally insulating member 20 when the thermally insulating cover 25 covers the self-tapping screw 30. The positioning flange 27 has an annular shape.

The self-tapping screw 30 extends through the second through hole 21 of the thermally insulating member 20 and the first through hole 13 of the fixed member 10. The self-tapping screw 30 has an upper end provided with a washer 31 and a hexagonal screw head 32. The screw head 32 is rotated by a driving tool, such as a pneumatic device or the like, to rotate the self-tapping screw 30. The washer 31 of the self-tapping screw 30 has a diameter greater than that of the second through hole 21 of the thermally insulating member 20. The thermally insulating cover 25 covers the washer 31 and the screw head 32 of the self-tapping screw 30 when the thermally insulating cover 25 is mounted on the thermally insulating member 20.

In the preferred embodiment of the present invention, the first plate 11 and the second plate 12 of the fixed member 10 are perpendicular to each other with an angle of ninety degrees defined therebetween.

In the preferred embodiment of the present invention, the first through hole 13 of the first plate 11 and the second through hole 21 of the thermally insulating member 20 have a circular shape.

In the preferred embodiment of the present invention, the two first perforations 14 of the second plate 12 and the two second perforations 22 of the thermally insulating member 20 have a rectangular shape.

In the preferred embodiment of the present invention, the thermally insulating member 20 is made of plastic material that satisfies an inflaming retarding standard of UL94. It is to be noted that, UL94, the standard for safety of flammability of plastic materials for parts in devices and appliances testing, is a plastics flammability standard released by Underwriters Laboratories of the United States.

In the preferred embodiment of the present invention, the thermally insulating member 20 is integrally formed with a connecting member 24 corresponding to the first plate 11 and the second through hole 21. The connecting member 24 is made of flexible material and is integrally connected with the thermally insulating cover 25.

In the preferred embodiment of the present invention, the thermally insulating member 20 has a bottom integrally formed with two positing pins 28 corresponding to the first plate 11. The two positing pins 28 have a tapered conical shape.

In the preferred embodiment of the present invention, the thermally insulating member 20 is injection coated on an exterior of the first plate 11 and the second plate 12 of the fixed member 10 as shown in FIG. 9.

Referring to FIGS. 15-19, the connecting member 24 is undefined, and the thermally insulating member 20 and the thermally insulating cover 25 are made individually and separated from each other. Thus, the thermally insulating cover 25 is removably mounted on the thermally insulating member 20.

Figure 20:
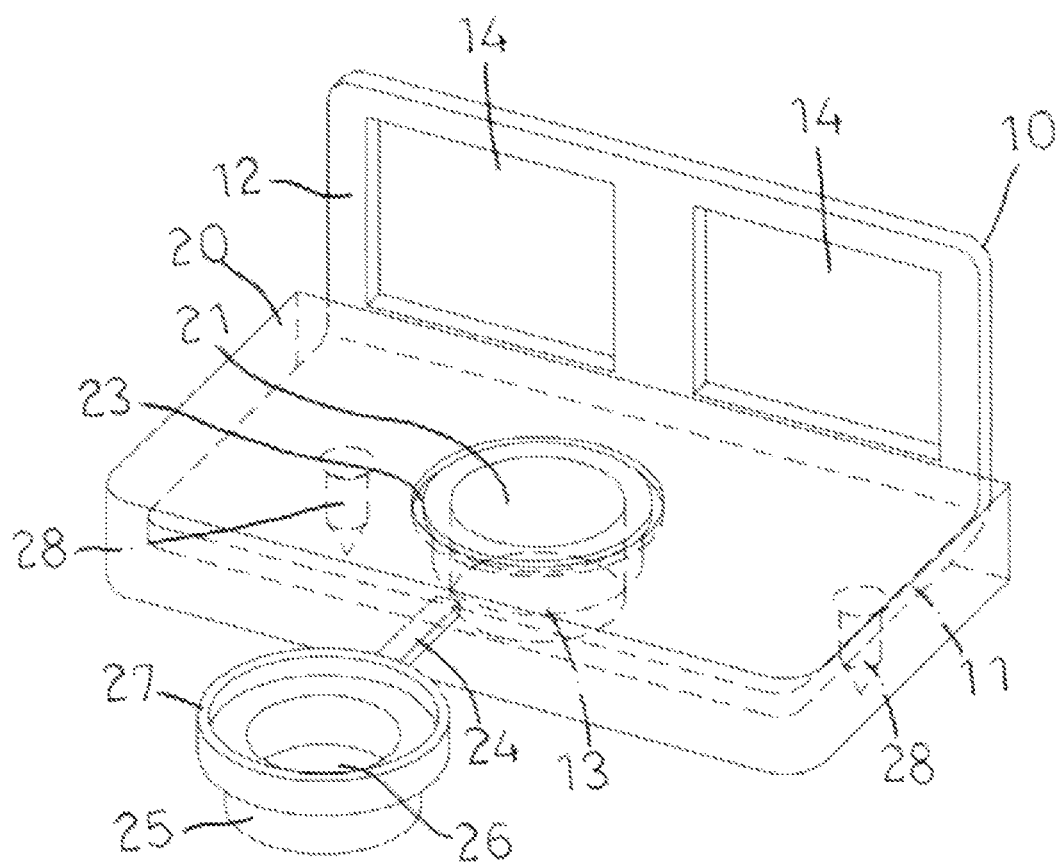
FIG. 20 is a partial perspective view of a thermally insulating fixture in accordance with the third preferred embodiment of the present invention.

Referring to FIG. 20, the thermally insulating member 20 is injection coated on an exterior of the first plate 11 of the fixed member 10.

Figure 21:
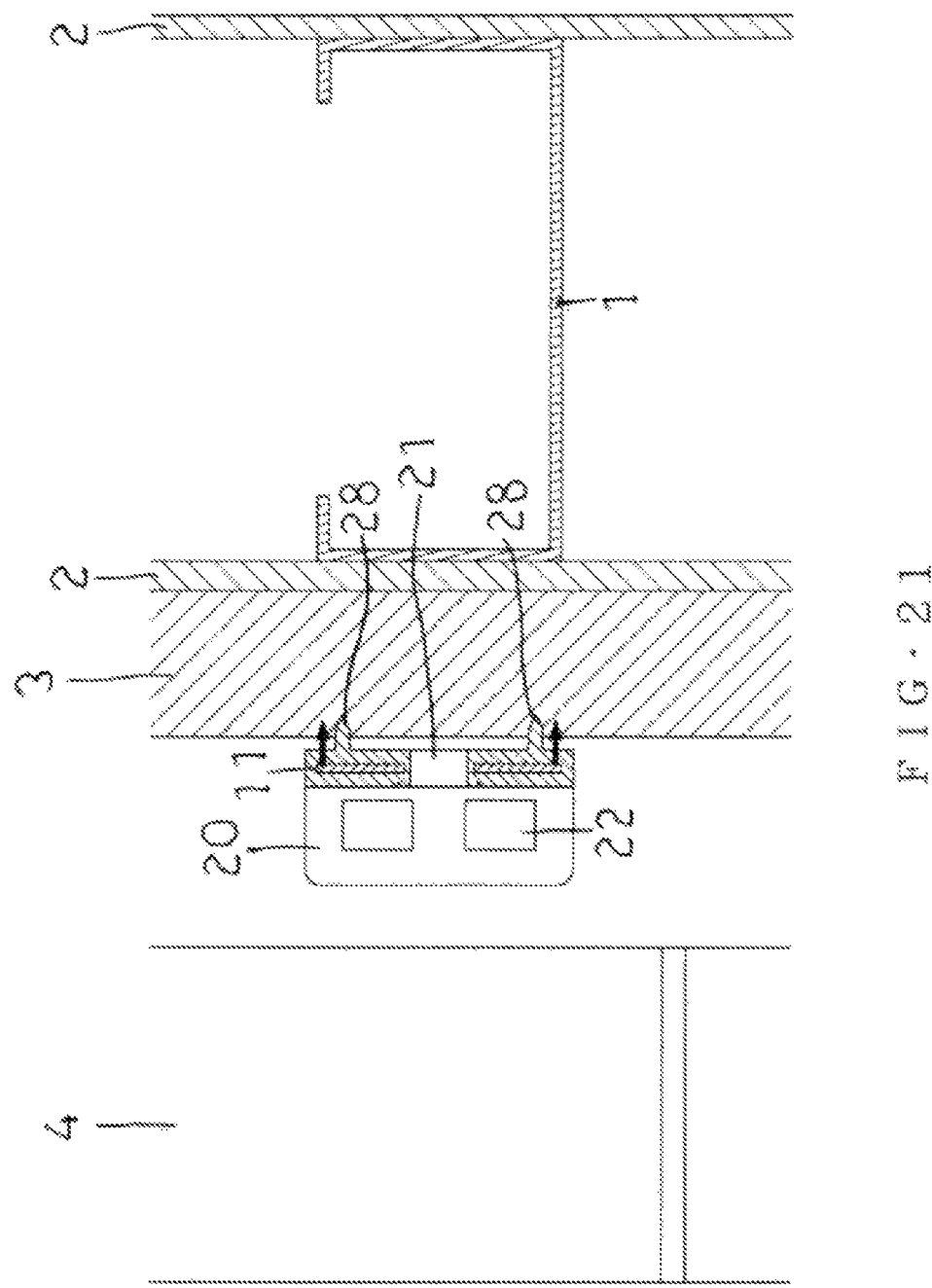
FIG. 21 is a partial cross-sectional operational view showing that the thermally insulating member are inserted into the foam layer.
Figure 22:
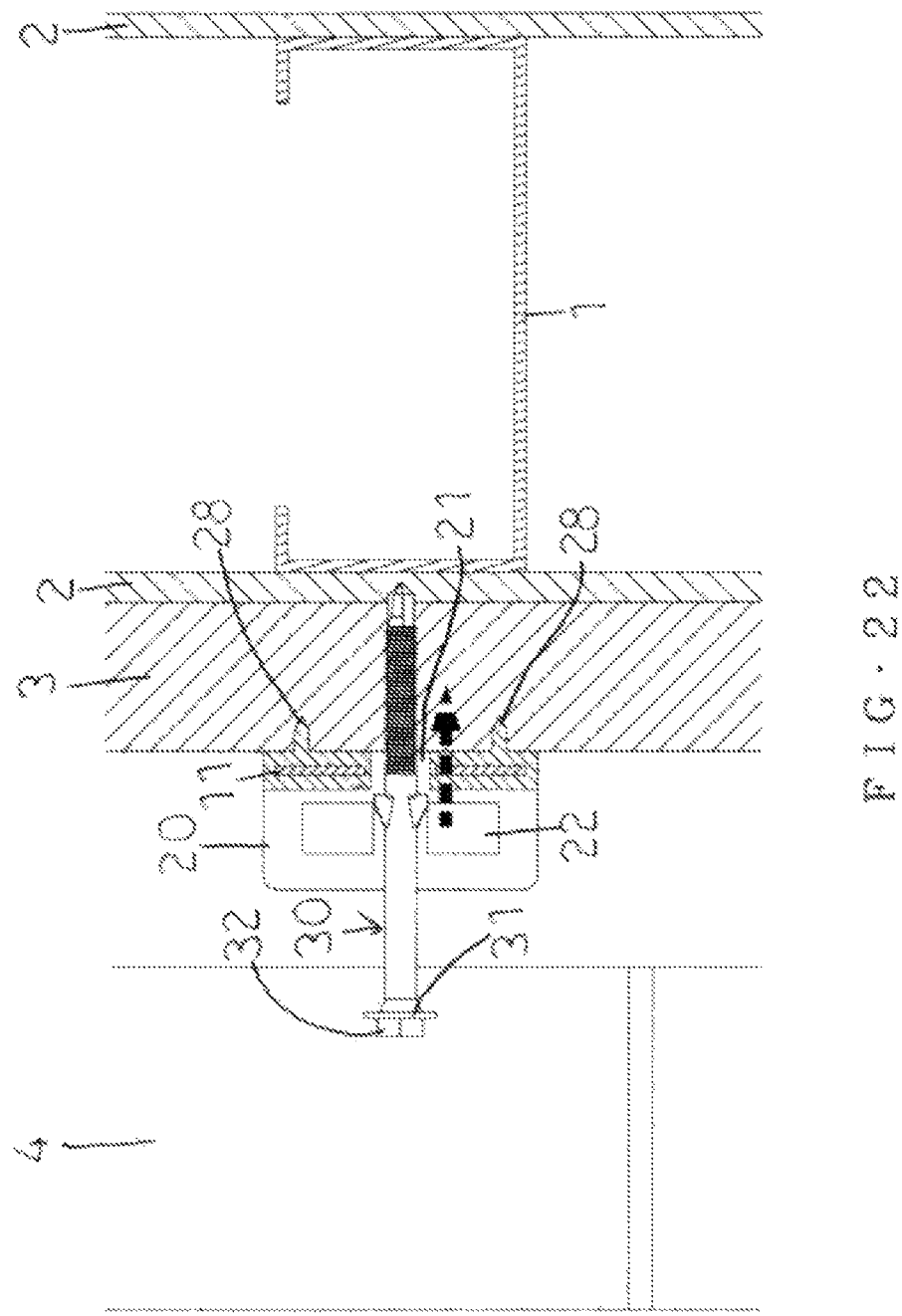
FIG. 22 is a partial cross-sectional operational view showing that the self-tapping screw is screwed through the thermally insulating member, the fixed member, and the foam layer into the outer one of the two panels.
Figure 23:
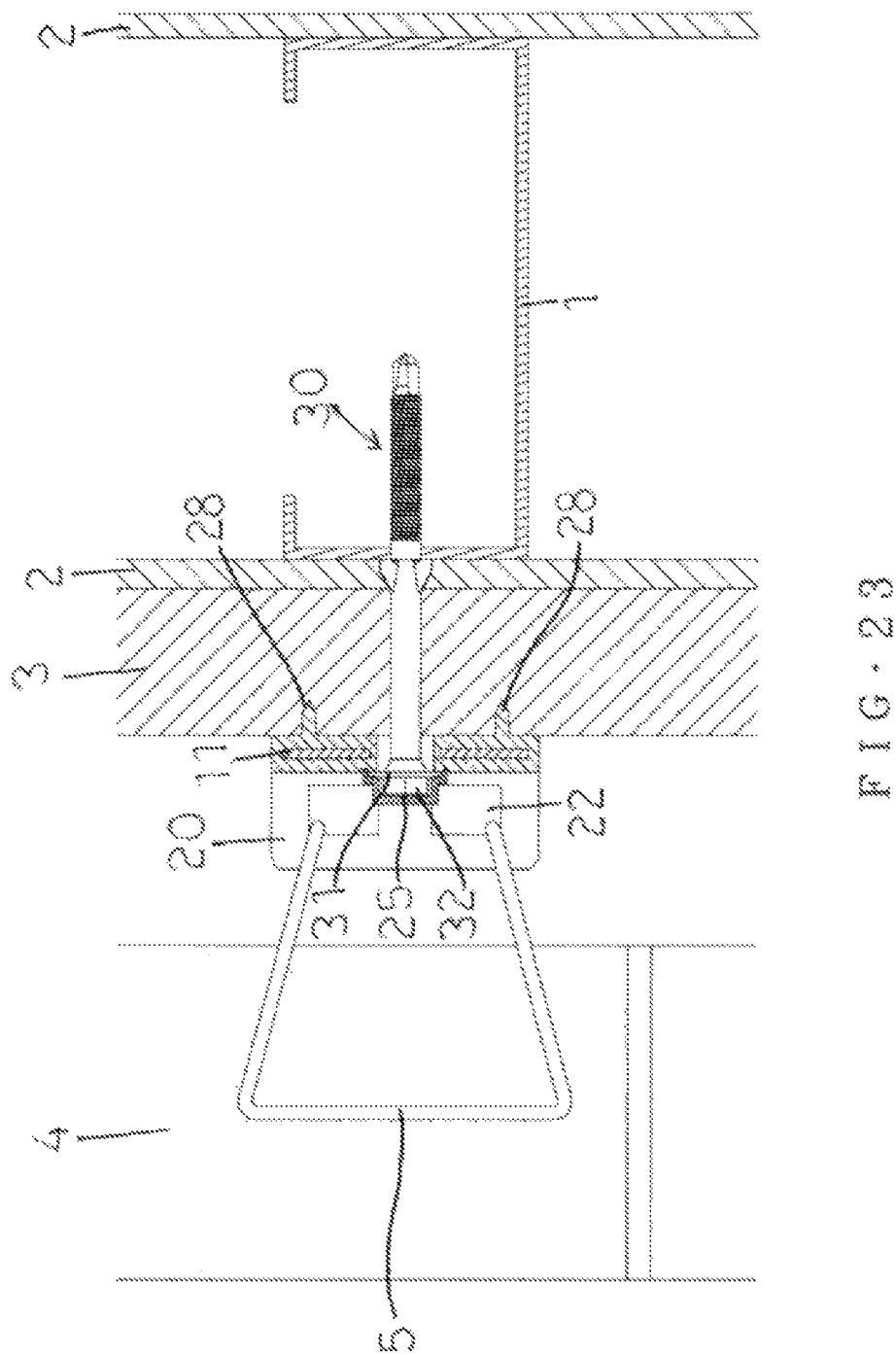
FIG. 23 is a partial cross-sectional operational view showing that the self-tapping screw is screwed into and positioned in the metal element.
Figure 24:
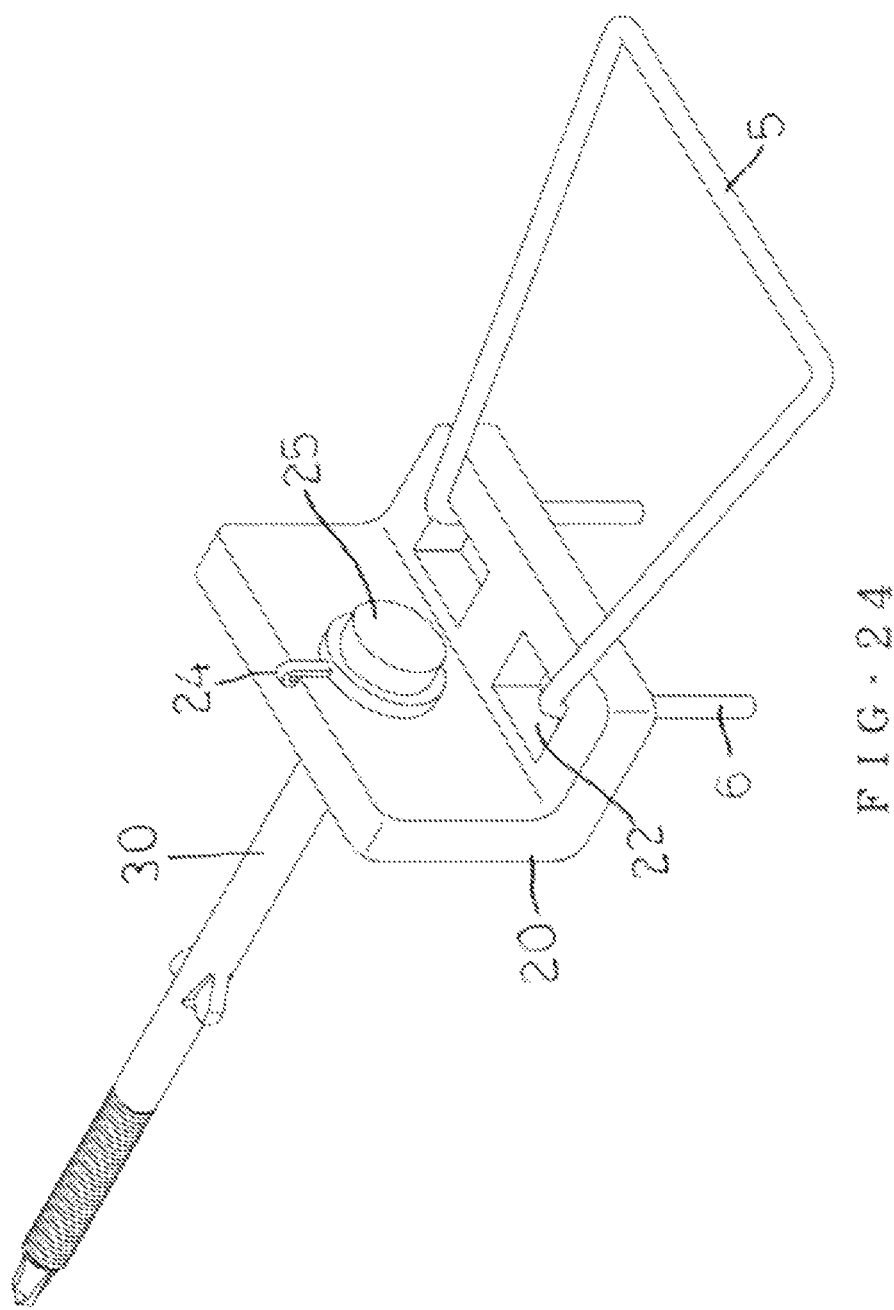
FIG. 24 is a perspective view showing that a positioning rack is mounted on the thermally insulating member.
Figure 25:
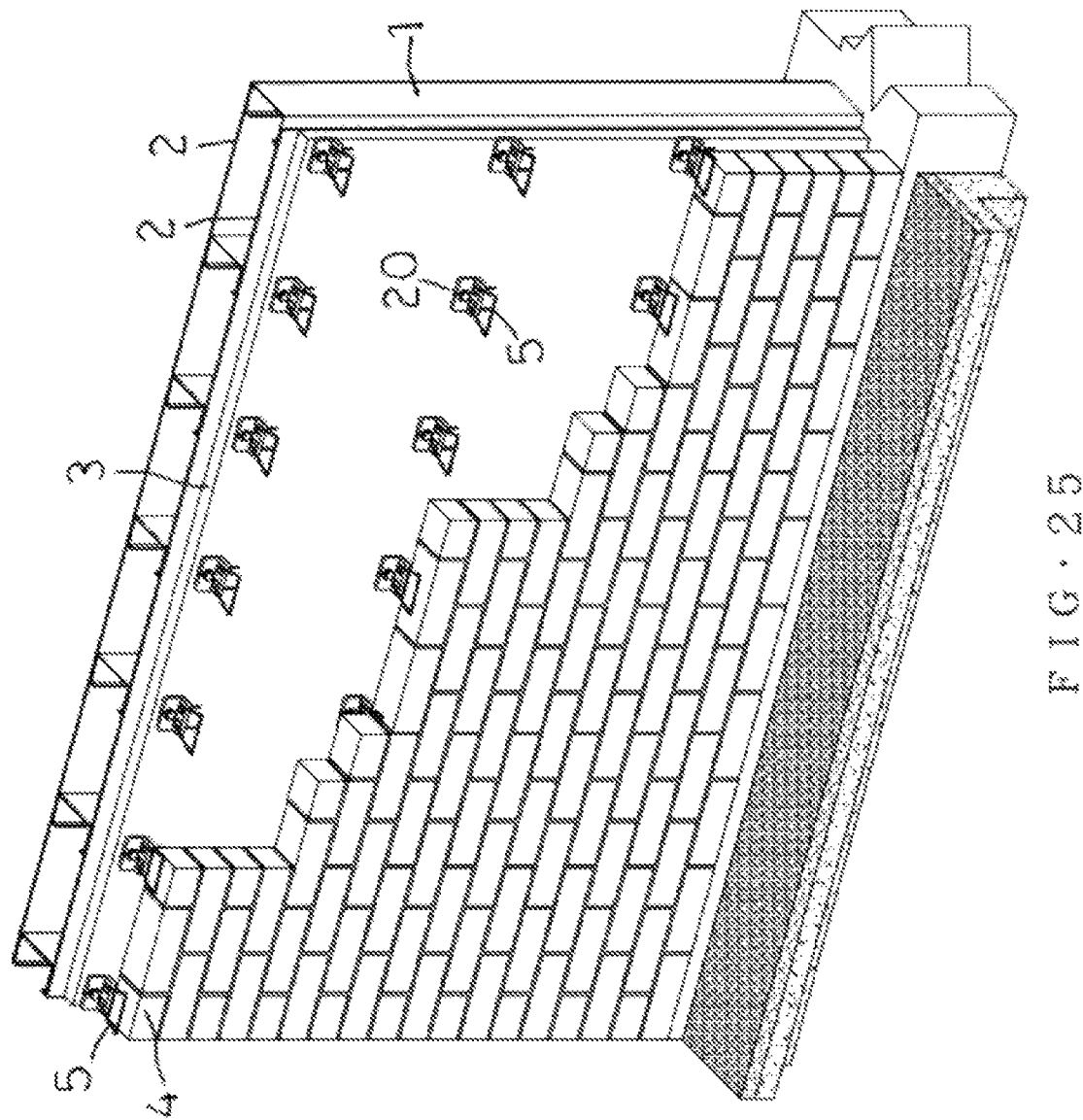
FIG. 25 is a perspective view showing that the bricks are paved.

In operation, referring to FIGS. 21-25 with reference to FIGS. 8-14, the thermally insulating fixture is worked on a brick wall. The brick wall includes two panels 2, a foam layer 3, a metal element 1, and a plurality of bricks 4. The foam layer 3 has a thermally insulating effect and is mounted on an outer one of the two panels 2. When the thermally insulating member 20 is mounted on the foam layer 3, the two positing pins 28 of the thermally insulating member 20 are inserted into the foam layer 3 as shown in FIG. 21. Then, the driving tool is mounted on the screw head 32 of the self-tapping screw 30 to rotate the self-tapping screw 30, so that the self-tapping screw 30 is in turn screwed through the thermally insulating member 20, the fixed member 10, and the foam layer 3 into the outer one of the two panels 2 as shown in FIG. 22. Then, the self-tapping screw 30 is screwed into and positioned in the metal element 1 as shown in FIG. 23. Then, the thermally insulating cover 25 is mounted on the thermally insulating member 20 and covers the washer 31 and the screw head 32 of the self-tapping screw 30. Then, a positioning rack 5 is mounted on the thermally insulating member 20, with two bent legs 62 of the positioning rack 5 being inserted into the two second perforations 22 of the thermally insulating member 20 as shown in FIG. 24. Thus, the positioning rack 5 is hooked on the thermally insulating member 20. Finally, the bricks 4 are paved as shown in FIG. 25.

Accordingly, the thermally insulating member 20 presses the foam layer 3 closely and tightly by the resilient ductility of the thermally insulating member 20, to provide a thermally insulating effect and to break or block a heat conduction or convection, thereby preventing the cold air in the winter or the hot air in the summer from entering the house. In addition, the thermally insulating cover 25 covers the washer 31 and the screw head 32 of the self-tapping screw 30, to enhance the thermally insulating effect. Further, the positioning flange 27 of the thermally insulating cover 25 is positioned in the positioning groove 23 of the thermally insulating member 20 when the thermally insulating cover 25 covers the self-tapping screw 30, to provide a better thermal isolating and heat preservation effect. Further, the fixed member 10 is worked easily and simply to save the cost of fabrication. Further, the thermally insulating member 20 coats the fixed member 10, and the thermally insulating cover 25 covers the self-tapping screw 30, thereby preventing the warm air in the house from being transferred outward through the fixed member 10 and the self-tapping screw 30. Further, the two positing pins 28 of the thermally insulating member 20 are inserted into and locked in the foam layer 3 so that the thermally insulating member 20 is secured to the foam layer 3 steadily. Further, the thermally insulating member 20 has an elastic feature to enhance the screwing and locking action of the self-tapping screw 30, such that the thermally insulating member 20 rests on the foam layer 3 smoothly and evenly.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:
1. A thermally insulating fixture comprising:
a self-tapping screw;
a fixed member mounted on the self-tapping screw; and
a thermally insulating member wrapping the fixed member;
wherein:
the fixed member has an L-shaped profile;

the fixed member is made of an iron sheet plate that is stamped and bent to form the fixed member;

the fixed member includes a first plate and a second plate;

the first plate of the fixed member is provided with a first through hole;

the second plate of the fixed member is provided with two first perforations;

the thermally insulating member is made of refractory material;

the thermally insulating member is integrally coated on an outside of the fixed member;

the thermally insulating member is provided with a second through hole corresponding to the first through hole of the first plate;

the thermally insulating member is provided with two second perforations corresponding to the two first perforations of the second plate respectively;

the thermally insulating member is provided with a positioning groove;

the positioning groove of the thermally insulating member surrounds the second through hole;

a thermally insulating cover is mounted in the positioning groove of the thermally insulating member and covers the self-tapping screw;

the thermally insulating cover has an interior provided with a receiving space which receives the self-tapping screw;

the thermally insulating cover has a periphery provided with a positioning flange which is positioned in the positioning groove of the thermally insulating member when the thermally insulating cover covers the self-tapping screw;

the positioning flange has an annular shape;

the self-tapping screw extends through the second through hole of the thermally insulating member and the first through hole of the fixed member; and the self-tapping screw has an upper end provided with a washer and a screw head.

2. The thermally insulating fixture as claimed in claim 1, wherein the first plate and the second plate of the fixed member are perpendicular to each other.

3. The thermally insulating fixture as claimed in claim 1, wherein the first through hole of the first plate and the second through hole of the thermally insulating member have a circular shape.

4. The thermally insulating fixture as claimed in claim 1, wherein the two first perforations of the second plate and the two second perforations of the thermally insulating member have a rectangular shape.

5. The thermally insulating fixture as claimed in claim 1, wherein the thermally insulating member is made of plastic material that satisfies an inflaming retarding standard of UL94.

6. The thermally insulating fixture as claimed in claim 1, wherein:
the thermally insulating member is integrally formed with a connecting member corresponding to the first plate and the second through hole;
the connecting member is integrally connected with the thermally insulating cover; and
the thermally insulating cover covers the washer and the screw head of the self-tapping screw when the thermally insulating cover is mounted on the thermally insulating member.

7. The thermally insulating fixture as claimed in claim 1, wherein the thermally insulating member has a bottom integrally formed with two positing pins corresponding to the first plate, and the two positing pins have a tapered conical shape.

8. The thermally insulating fixture as claimed in claim 1, wherein the thermally insulating member is injection coated on an exterior of the first plate and the second plate of the fixed member.

9. The thermally insulating fixture as claimed in claim 1, wherein the thermally insulating member is injection coated on an exterior of the first plate of the fixed member.

10. The thermally insulating fixture as claimed in claim 1, wherein the washer of the self-tapping screw has a diameter greater than that of the second through hole of the thermally insulating member.

* * * * *